(12) United States Patent
Borella et al.

(10) Patent No.: US 6,940,836 B2
(45) Date of Patent: Sep. 6, 2005

(54) METHOD AND APPARATUS FOR INDICATING QUALITY OF SERVICE TO A RADIO ACCESS NETWORK

(75) Inventors: Michael Borella, Naperville, IL (US); Sundar Raman, Arlington Heights, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 10/230,847

(22) Filed: Aug. 29, 2002

(65) Prior Publication Data

US 2004/0042423 A1 Mar. 4, 2004

(51) Int. Cl.[7] ................................. H04Q 7/00
(52) U.S. Cl. ..................... 370/331; 370/401; 455/435.2
(58) Field of Search ................................. 370/331, 335, 370/338, 328, 401; 455/432.3, 435.3, 435.2, 466

(56) References Cited

U.S. PATENT DOCUMENTS

| | | | |
|---|---|---|---|
| 5,732,214 A | * 3/1998 | Subrahmanyam | 709/227 |
| 6,192,248 B1 | * 2/2001 | Solondz | 455/450 |
| 6,522,733 B1 | * 2/2003 | Cook | 379/112.06 |
| 6,529,527 B1 | * 3/2003 | Chen et al. | 370/503 |
| 6,606,311 B1 | * 8/2003 | Wang et al. | 370/338 |
| 2001/0031634 A1 | * 10/2001 | Mizutani et al. | 455/425 |
| 2002/0021681 A1 | * 2/2002 | Madour | 370/331 |
| 2003/0073453 A1 | * 4/2003 | Basilier | 455/503 |
| 2003/0112779 A1 | * 6/2003 | Parekh et al. | 370/335 |
| 2003/0227871 A1 | * 12/2003 | Hsu et al. | 370/230 |
| 2004/0008632 A1 | * 1/2004 | Hsu et al. | 370/252 |

OTHER PUBLICATIONS

3rd Generation Partnership Project 2 "3GPP2", 3GPP2–A20, "User Level QOS Support in the CDMA2000 RAN", Oct. 15, 2001, © 2000 Tekefonaktiebolaget.
3rd Generation Partnership Project 2 "3GPP2", 3GPP2–A20, "IP User Level QoS", Oct. 15, 2001, © 2001 Lucent Technologies, 3 pages.
3rd Generation Partnership Project 2 "3GPP2", 3GPP2–A20, "A8–A11 IP Transport QoS Framework", Oct. 15, 2001, © 2000 Lucent Technologies, 4 pages.
3rd Generation Partnership Project 2 "3GPP2", 3GPP2 S.P0063, Version 1.0, "Subscribed Rate for Packet Data Service, Stage 1 Requirements", Jan. 23, 2002, © 2002 3GPP2, 11 pages.
3rd Generation Partnership Project 2 "3GPP2", Section 10, "E2E QoS Text for the Transport", Mar. 11, 2002, 5 pages.
3rd Generation Partnership Project 2 "3GPP2", 3GPP2 S.P0035, Version 1.2, "Quality of Service, Stage 1 Requirements", Jun. 10, 2002, © 2001, 2002 3GPP2, 15 pages.
3rd Generation Partnership Project 2 "3GPP2", 3GPP2–A30, "IOS Support for the Subscribed Rate Feature—Stage–3 Text", Jul. 8, 2002, © 2002 Motorola, Inc., 13 pages.

* cited by examiner

*Primary Examiner*—Chi Pham
*Assistant Examiner*—Keith M. George
(74) *Attorney, Agent, or Firm*—Fitch, Even, Tabin & Flannery

(57) ABSTRACT

Level of service information for a given user of a radio access network (10) is determined at a Packet Data Serving Node (18) and provided to the radio access network for use in determining a particular level of service to provide to the given user. The level of service can comprise an absolute level of service (such as a maximum data rate to be accorded the user) or a dynamic relative level of service (such as information that is used to compare competing users to determine a particular current apportioning of communications resources). In one embodiment, the level of service information is provided to the radio access network via a modified A11 registration update message.

46 Claims, 3 Drawing Sheets

METHOD AND APPARATUS FOR INDICATING QUALITY OF SERVICE TO A RADIO ACCESS NETWORK

TECHNICAL FIELD

This invention relates generally to radio access networks and more particularly to quality of service as extended to packet data users in such a network.

BACKGROUND

Radio access networks of various kinds are well known in the art. Some networks, such as CDMA2000 radio access networks, will accommodate a variety of call types including both voice and packet data communications. Packet data communications are generally supported by appropriately coupling the radio access network to a packet data network.

Packet data networks are also well known in the art with the Internet being one especially well known example. In such a system, packets of data are moved from a source to a target through one or more routers. Present protocols that support such packet routing include an accommodation for at least a modest level of quality of service differentiation. For example, a so-called Differentiated Services (or diffserv) byte can be included in a packet to identify a particular dynamic level of quality of service that routers may accord when possible. This quality of service tends to be relative rather than absolute. For example, when a router has two packets queued for forwarding, the router can use the diffserv byte to identify when one of the packets has a higher quality of service rating. This differentiation can then be used by the router to dynamically permit selection of the relatively higher rated packet for forwarding ahead of the lower rated packet.

Unfortunately, even relatively sophisticated and packet-friendly systems such as CDMA2000 radio access networks are not designed to recognize or accommodate quality of service indicators such as the diffserv byte. This results in part because the design of such a system strives to establish a tunnel from the mobile unit to the Packet Data Serving Node (or PDSN). This is accomplished in part by layered protocols. So configured, the quality of service information is buried too deeply for the radio access network to acquire or otherwise recognize. As a result, the wireless link between the mobile unit and the radio access network, as well as other links within the radio access network, will ordinarily function without access to such quality of service information. This means, of course, that the radio access network provides services to various mobile users without offering the differentiation and preferential treatment for certain IP packets that packet data infrastructures will ordinarily support.

BRIEF DESCRIPTION OF THE DRAWINGS

The above needs are at least partially met through provision of the method and apparatus for indicating quality of service to a radio access network described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a Packet Data Serving Node couples to a radio access network (such as, for example, to a Packet Control Function (PCF) via an interface link that is compatible with A10/A11 protocols). The Packet Data Serving Node serves, in part, to provide an indication of a given persisting level of service for a given user of the radio access network. ("Persisting" refers to maintenance of the indicated level of service for communications that are subsequent to the communication that itself included the indication.) In one embodiment, a Packet Control Function (PCF) initially receives this indication. The radio access network can then use this indication of the given level of service (such as a given maximum data rate) to allocate, for example, a given quality of service to the corresponding user for the duration of a corresponding data session.

In one embodiment, the Packet Data Serving Node uses a user identifier as provided in a session initiation message (pursuant, for example, to a PPP or a mobile IP protocol) to obtain corresponding quality of service information (as can be stored, for example, in a foreign/home authentication, authorization, and accounting unit). The Packet Data Serving Node then provides this quality of service information to the radio access network (such as, for example, by including the quality of service indication as part of an A11 registration update message which may advantageously be asynchronously transmitted by the Packet Data Serving Node (although if desired, of course, synchronous transmission of such information can be compatibly accommodated as well)). The radio access network can then use this indication to establish, for example, a given absolute quality of service (such as a maximum data rate) to a given user for a specific session. If desired, and in a preferred embodiment, such a transmission may also include a corresponding diffserv byte to further facilitate a relative level of service at appropriate junctions within the radio access network for user packets.

Figure 1:
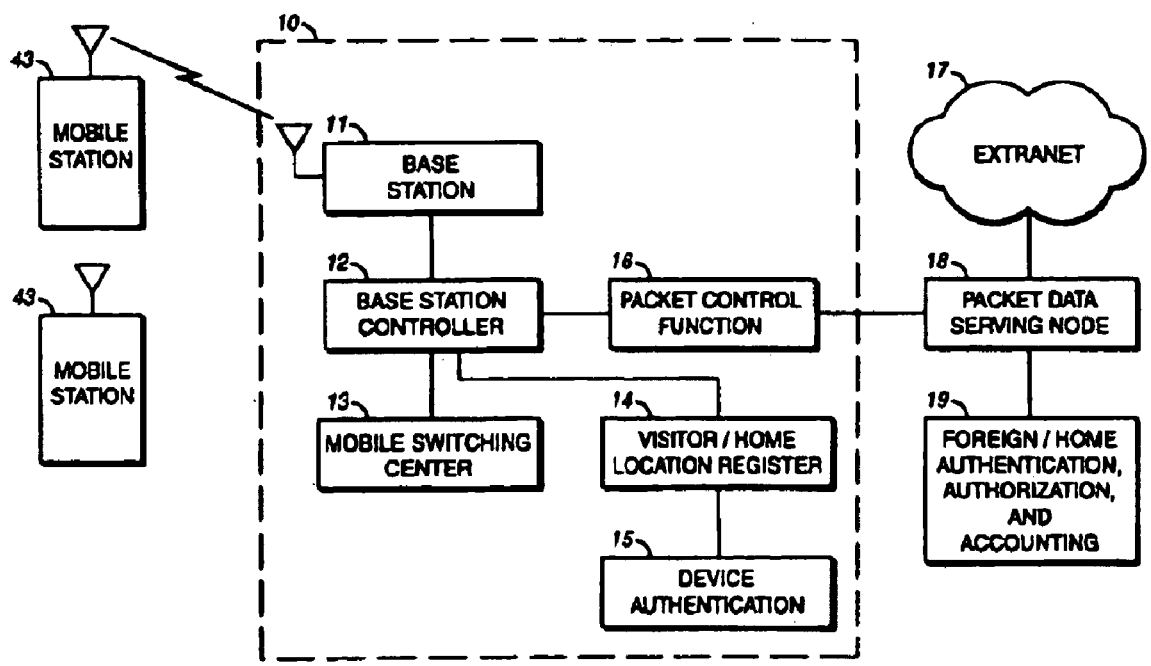
FIG. 1 comprises a block diagram as configured in accordance with an embodiment of the invention.

Referring now to FIG. 1, for purposes of these illustrative embodiments, the radio access network 10 will comprise a CDMA2000 radio access network. It should be understood that other wireless platforms, protocols, and architectures can similarly benefit from these embodiments. Therefore, it should be clear that these embodiments are not limited to only CDMA2000 radio access networks.

The radio access network 10 will usually have a plurality of base stations 11 (FIG. 1 depicts only a single base station for purposes of clarity) that couple to a base station controller 12. The base station controller 12 serves various functions and in particular serves to allocate network resources to support communications by an authorized user population of mobile stations (typically, each mobile station has a corresponding unique device identifier). The base station controller 12 will typically couple to a mobile switching center 13 that will serve, at least in part, to facilitate communications for the wireless user population.

The base station controller 12 will also usually couple to a visitor/home location register 14 that in turn have access to device authentication information 15. The latter elements serve to confirm that a given mobile station is authorized to conduct communications via the radio access network 10. Unfortunately, these latter elements, while capable of recognizing a given device (and, in some systems, a given user) for such authentication purposes, are not able to also correlate that recognition with a predetermined level of service to be accorded that user or device when supporting a packet data session.

The base station controller 12 also couples, typically via an A8/A9 link, to a Packet Control Function 16 (it should be understood that the base station controller and the Packet Control Function are separate logical functions but may, or may not, occupy a common housing in a given implementation). The Packet Control Function serves, as well understood in the art, to support and facilitate packet data communications between the wireless user population serviced by the radio access network 10 and, for example, an extranet 17 (such as the Internet, an internet, and/or one or more intranets). The Packet Control Function 16 then couples, typically via a communications link that provides an A10/A11 compatible protocol, to a Packet Data Serving Node 18. As well understood in the art, it is the Packet Data Serving Node 18 that facilitates the coupling between the extranet 17 and the radio access network 10.

Figure 2:
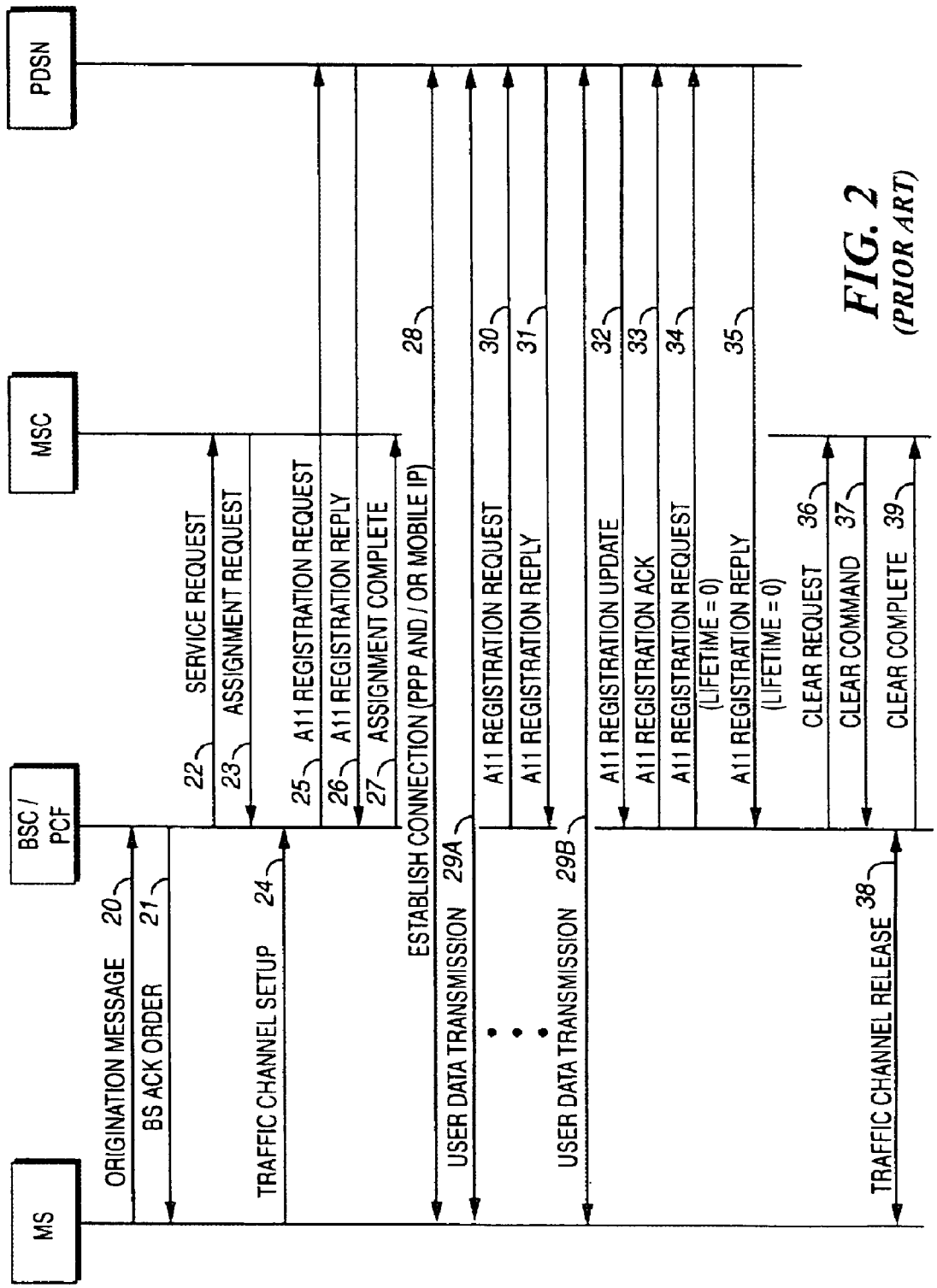
FIG. 2 comprises a timing diagram as configured in accordance with the prior art.

Referring now to FIG. 2, within the context of this illustrative example it will be helpful to understand in somewhat more detail the series of steps by which a packet data session is presently set up, conducted, and broken down (in conformance with CDMA2000 protocols). (Note, for purposes of this immediate description, the base station controller and the Packet Control Function are considered to be essentially the same entity.)

The process begins when a mobile station transmits a wireless origination message 20 to the base station controller/Packet Control Function which then responds with an acknowledgement 21. The base station controller/Packet Control Function then forwards a service request 22 to the mobile switching center which will respond in an appropriate case with an assignment message 23. The base station controller/Packet Control Function will then establish a traffic channel 24 with the mobile station and also forward an A11 registration request 25 to the Packet Data Serving Node. The latter will respond with an A11 registration reply 26 and the base station controller/Packet Control Function will signal that the assignment is complete 27 to the mobile switching center.

This effectively results in establishing a transparent link between the mobile station and the Packet Data Serving Node. The mobile station and the Packet Data Serving Node establish a connection 28 (using, typically, either point-to-point protocol (PPP) and/or mobile IP on an A10 link) and, once that connection is established, the mobile station will conduct its data transmissions 29A and 29B. This data session is occasionally refreshed from time to time with an A11 registration request 30 from the [note: the BSC does not know about A11, only about A8/A9, so only PCF is necessary here]Packet Control Function and a corresponding A11 registration reply 31 from the Packet Data Serving Node.

To conclude the data session, the Packet Data Serving Node initiates an A11 registration update message 32 to which the base station controller/Packet Control Function responds with an A11 registration acknowledgement 33. The Packet Control Function then sources an A11 registration request 34 where the lifetime parameter is set to "0" and the Packet Data Serving Node will respond with an A11 registration reply 35 where the lifetime parameter is again set to "0." The base station controller [note the PCF does not know about communication with the MSC] will now send a clear request 36 to the mobile switching center which will respond with a clear command 37. The base station controller will now release the traffic channel 38 and transmit a clear complete message 39 to the mobile switching center.

It can be seen that the A11 registration update message 32 is used only by the Packet Data Serving Node and only to initiate the termination of a packet data session. Pursuant to one embodiment disclosed herein, the semantics of this message are altered to permit inclusion of information that comprises an indication of a level of service to be accorded to the user without also causing a data session to terminate prematurely.

As also well understood in the art, the Packet Data Serving Node 18 also couples to a foreign/home authentication, authorization, and accounting unit 19. The latter unit 19 provides a variety of services (including generally serving as an accounting and billing server to support the provision of packet data services). In addition, pursuant to various embodiments set forth herein, the foreign/home authentication, authorization, and accounting unit 19 comprises a memory that stores subscriber profiles. These subscriber profiles include level of service indicators for various subscribers in the radio access network user population. For example, a first registered subscriber can have a corresponding level of service indicator that equates to a first maximum data rate (with respect to the wireless resources themselves) and a second registered subscriber can have a corresponding level of service indicator that equates to a second lower maximum data rate.

Higher or lower data rates can be apportioned and assigned in accordance with a variety of criteria, including but not limited to corresponding fees, time of day, day of week, category of user, duration of broadcast, and so forth. In general, such maximum data rates tend to comprise an absolute level of service as versus a dynamic relative level of service. That is, the level of service indicator will more likely tend to be used by the radio access network to apportion resources to the subscriber as a function of the level of service indicator itself and not with respect to a dynamic relative comparison to other current, recent, or potential users.

So configured, and as well understood in the art, upon establishing a data session, a wireless user will forward a message to the Packet Data Serving Node 18 that comprises a request to access the extranet. This message will also include an identifier for the user that corresponds to the user's status, typically, as the subscriber of a service such as a wireless packet data service (such as, by way of illustration, "user123@ranABC.com"). (In many instances, the message may also include a password that is unique to the user's identifier. Also, in some instances, the user identifier may be at least partially derived from the device identifier for the mobile station itself) The radio access network 10 will transport this message to its Packet Control Function 16 where the message is then provided to the Packet Data Serving Node 18. Pursuant to a preferred embodiment, the Packet Data Serving Node 18 will use the user identifier to address the foreign/home authentication, authorization, and accounting unit 19 to both authenticate this particular activity (in accord with prior art practice) and also to identify a corresponding level of service indicator for this subscriber. It is this level of service indicator that the Packet Data Serving Node 18 then returns to the radio access network 10 (and particularly, in the first instance, to the Packet Control Function 16). The radio access network 10 can then use the information as appropriate to facilitate the provision of suitable quality of service levels (including maximum wireless data rates) on a subscriber-by-subscriber basis.

There are various ways by which the Packet Data Serving Node can provide such information to the radio access network 10. Pursuant to one approach, an entirely new message designed to support this particular content can be agreed upon by relevant equipment and software suppliers and used thereafter to transport the level of service indicator from the Packet Data Serving Node 18 to the radio access network 10. Pursuant to another approach, an existing message is utilized to transport the level of service indicator. More particularly, the A11 registration update message can be modified to transport such information as mentioned above.

The A11 registration update message has a format that can be readily enhanced to transport a level of service indicator without necessarily altering the overall compatibility of the message itself. For example, a quality of service parameters extension value can be inserted between the session specific extension field and the registration update authentication extension field as presently defined for the registration update message. Including the quality of service parameters at this position has the benefit of ensuring that the extension will be protected by the authentication hash provided in CDMA2000.

Figure 3:
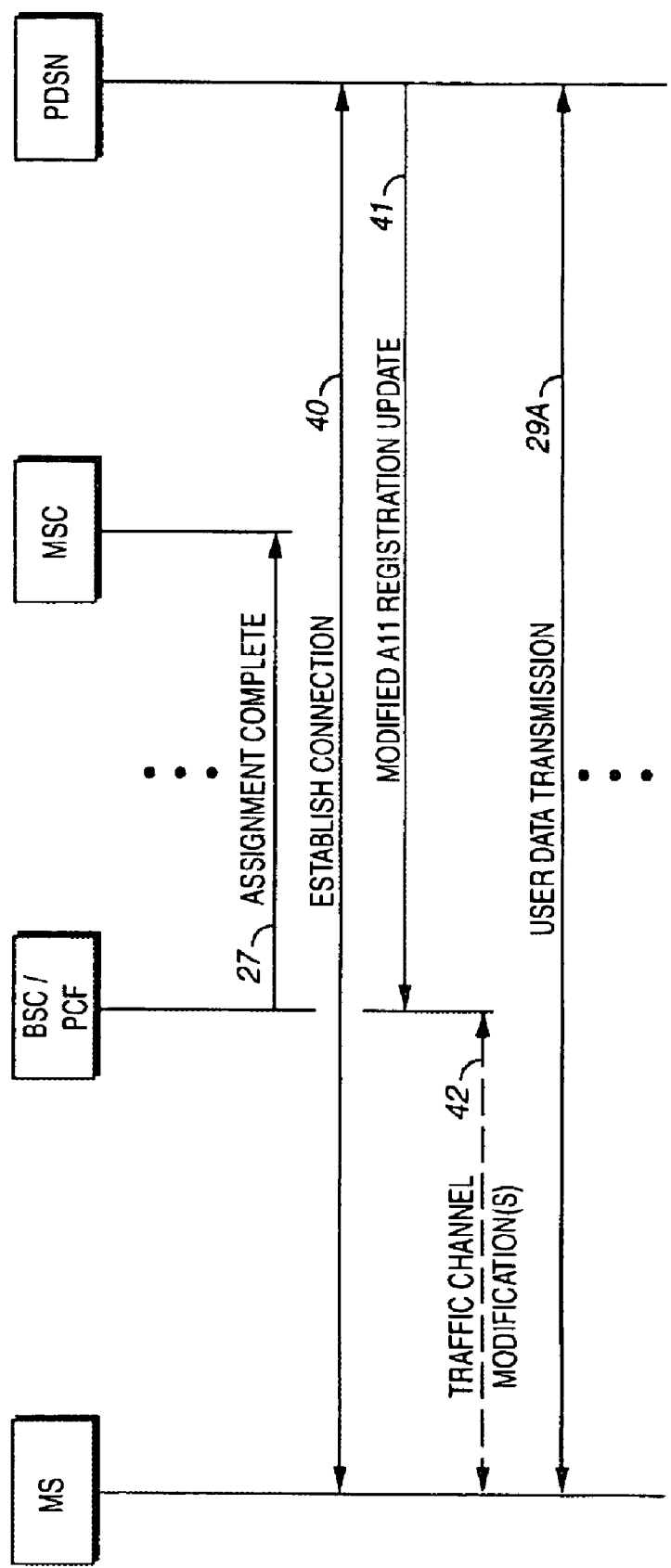
FIG. 3 comprises a detailed timing diagram as configured in accordance with an embodiment of the invention.

So configured, and referring now to FIG. 3, the process described with respect to FIG. 2 can again be carried out up to and including the transmission of the assignment complete 27 message from the base station controller/Packet Control Function to the mobile switching center. When the mobile station communicates with the Packet Data Serving Node to establish the packet data session connection 40, the mobile station will transmit a user identifier as noted above. The Packet Data Serving Node can use that user identifier and, in conjunction with the foreign/home authentication, authorization, and accounting unit 19, ascertain one or more corresponding levels of service for that user. Upon obtaining that information, an indication of the relevant level of service is then transmitted to the Packet Control Function as embedded within a modified A11 registration update message 41 as described above. (One advantage of using the A11 registration update message is that this message can be compatibly transmitted asynchronously. This aspect may result in being able to provide the quality of service information to the radio access network more quickly. If desired, however, the level of service bearing message could be transmitted using a synchronous protocol or message as well.) Such information can be used in various ways by the radio access network. For example, such quality of service information can be readily used within the radio access network (and particularly between the base station controller 12 and the Packet Control Function 16), to effect provision of absolute and/or relative levels of service to packets that are sourced by the user and/or that are directed to the user. In this context it should also be understood that the level of service information can include multiple values to thereby establish a first level of service for data traffic as sourced by the subscriber and a second level of service for data traffic that is directed to the subscriber (for example, the outbound traffic to the subscriber may be accorded a higher maximum data rate than the data that is sourced by the subscriber). As another example, when the level of service indication corresponds to a maximum data rate, the base station controller/Packet Control Function can communicate further with the mobile station to modify the traffic channel 42 as necessary to accommodate the indicated level of service (for example, the data rate as already established when setting up the traffic channel can be altered upwardly or downwardly to match or at least better accord with the indicated data rate).

In the example provided, the Packet Data Serving Node uses the user identifier to locate a corresponding level of service for that user. Such a predetermined level of service may, or may not, exist for each given user. As an alternative (or in combination with the above described approach), the Packet Data Serving Node can instead use the diffserv byte as is often included in the header information for the user's packets. (Such an approach, of course, may be inadvisable unless the level of service indications as obtained directly from a user can be verified as authentic and authorized to be honored in such a system.). As before, when the packet data session reaches the point where the mobile station is communicating essentially directly with the Packet Data Serving Node, the packets from the mobile station can be examined by the Packet Data Serving Node to identify the diffserv byte when present. The level of service as indicated by that diffserv byte can then be communicated back to the radio access network (for example, essentially in the same fashion as described above for indicators that are obtained from the foreign/home authentication, authorization, and accounting unit). And, as before, the radio access network can now use that information as desired to implement a given level of service to the subscriber. As a more specific example, dynamic relative service information such as the diffserv value for the given subscriber can be so communicated as one of two types (for communications moving in a forward direction towards the mobile user and for communications moving in a reverse direction away from the mobile user), a one byte length, and a value that equates to the user's diffserv byte. (Non-dynamic absolute service information such as a maximum data rate limitation value for the given user can also be communicated as described above as one of two types (again to correspond to the forward and reverse directions of communication), a four byte length, and a value that corresponds to the maximum data rate in bits per second (using, for example, a four byte unsigned integer format).)

In general, the above embodiments should work compatibly with existing CDMA2000 networks. It is possible, however, that a given designer/manufacturer might configure their network in a way that leads to incompatibilities should the above options be used. To protect against this, if desired, the Packet Control Function 16 could signal the Packet Data Serving Node 18 that the Packet Control Function 16 is capable of supporting the reception of such levels of service indicators. Such an indication could be provided in the first instance (when the Packet Control Function 16 first forwards a new session message to the Packet Data Serving Node 18) or could be provided later. As another alternative, the Packet Data Serving Node 18 could specifically query the Packet Control Function 16 regarding such capability.

Pursuant to the various embodiments disclosed above, various kinds of quality of service can be arranged for a mobile station when accessing a packet data network via a radio access network. Either or both diffserv byte quality of service parameters and levels of service as correlate in a predetermined way with the user's identifier can be identified by a Packet Data Serving Node and provided to the radio access network for corresponding and appropriate use (by, for example, using a particular maximum data rate on the wireless channel provided to the mobile station). Either new message formats can be used to transport such information from the Packet Data Serving Node to the radio access network or existing message formats can be slightly modified to likely work in a compatible fashion for the desired purposes. Essentially no new components are required to attain these benefits, and the desired results can be obtained with only slight programming alterations to relevant components. These solutions also promise considerable flexibility to accommodate a wide range and kinds of levels of service.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
   providing a Packet Control Function unit as coupled to a wireless communication system;
   providing a Packet Data Serving Node as coupled to another communication system;
   providing a communications link between the Packet Control Function unit and the Packet Data Serving Node;
   providing an indication of a given persisting level of service for a given user of the wireless communication system from the Packet Data Serving Node to the Packet Control Function unit, wherein providing an indication of a given persisting level of service for a given user of the wireless communication system from the Packet Data Serving Node to the Packet Control Function unit comprises providing the indication of the given Persisting level of service in at least one asynchronously transmitted message.

2. The method of claim 1 wherein providing a Packet Control Function unit as coupled to a wireless communication system includes providing a Packet Control Function unit as coupled to a base station controller for the wireless communication system.

3. The method of claim 1 wherein providing a Packet Control Function unit as coupled to a wireless communication system includes providing a Packet Control Function unit as coupled to a wireless communication system that supports at least one mobile station, wherein the at least one mobile station has a corresponding device identifier.

4. The method of claim 3 wherein the at least one mobile station sources data communications for a user as facilitated through use of a user identifier, wherein the user identifier is different than the device identifier.

5. The method of claim 3 wherein the at least one mobile station sources data communications for a user as facilitated through use of a user identifier, wherein the user identifier is at least partially derived from the device identifier.

6. The method of claim 4 wherein providing an indication of a given persisting level of service for a given user of the wireless communication system from the Packet Data Serving Node to the Packet Control Function unit includes determining the given persisting level of service as a function, at least in part, of the user identifier for the given user.

7. The method of claim 1 wherein providing a communications link includes providing an A10/A11 compatible protocol on the link.

8. The method of claim 1 wherein providing the indication of the given persisting level of service in at least one asynchronously transmitted message includes providing the indication of the given persisting level of service as a part of an A11 update message.

9. The method of claim 8 wherein providing the indication of the given persisting level of service as a part of an A11 update message comprises providing the indication of the given persisting level of service as a part of an A11 registration update message.

10. The method of claim 1 and further comprising using the indication of the given persisting level of service in the wireless communication system to provide a corresponding level of service to the given user for at least some subsequent communications.

11. The method of claim 10 wherein the corresponding level of service comprises, at least in part, a resource allocation value.

12. The method of claim 11 wherein the resource allocation value includes, at least in part, an indication of a data rate.

13. The method of claim 12 wherein the data rate comprises a maximum data rate to be used by the wireless communication system when supporting at least one kind of communication with the given user.

14. The method of claim 1 wherein providing an indication of a given persisting level of service for a given user of the wireless communication system includes providing an indication for a first given persisting level of service for the given user of the wireless communication system and a second given persisting level of service for the given user of the wireless communication system.

15. The method of claim 14 wherein the first given persisting level of service corresponds to a given persisting level of service for communications sourced by the given user and the second given persisting level of service corresponds to a given persisting level of service for communications directed to the given user.

16. A method, comprising:
   providing a Packet Control Function unit as coupled to a wireless communication system;
   providing a Packet Data Serving Node as coupled to another communication system;
   providing a communications link between the Packet Control Function unit and the Packet Data Serving Node;
   providing an indication of a given persisting level of service for a given user of the wireless communication system from the Packet Data Serving Node to the Packet Control Function unit, wherein providing an indication of a given persisting level of service for a given user of the wireless communication system from the Packet Data Serving Node to the Packet Control Function unit includes providing the indication of the given persisting level of service in at least one synchronously transmitted message.

17. A method, comprising:
   providing a Packet Control Function unit as coupled to a wireless communication system;
   providing a Packet Data Serving Node as coupled to another communication system;
   providing a communications link between the Packet Control Function unit and the Packet Data Serving Node;
   providing an indication of a given persisting level of service for a given user of the wireless communication system from the Packet Data Serving Node to the Packet Control Function unit;

using the indication of the given persisting level of service in the wireless communication system to provide a corresponding level of service to the given user for at least some subsequent communications, wherein the corresponding level of service comprises, at least in part, a resource allocation value and wherein the resource allocation value comprises a first data rate to be used by the wireless communication system when supporting at least some transmissions from the given user and a second data rate to be used by the wireless communication system when supporting at least some transmissions to the given user.

18. A method, comprising:

providing a Packet Control Function unit as coupled to a wireless communication system;

providing a Packet Data Serving Node as coupled to another communication system;

providing a communications link between the Packet Control Function unit and the Packet Data Serving Node;

providing an indication of a given persisting level of service for a given user of the wireless communication system from the Packet Data Serving Node to the Packet Control Function unit;

using the indication of the given persisting level of service in the wireless communication system to provide a corresponding level of service to the given user for at least some subsequent communications, wherein the corresponding level of service comprises, at least in part, a resource allocation value and wherein the resource allocation value comprises a value that corresponds to a dynamic relative level of service to be accorded the given user relative to corresponding resource allocation values as are accorded to other users, such that the relative level of service does not correspond to a given absolute level of service.

19. A method, comprising:

receiving from a wireless communication unit via a wireless communication system and a wireless connection a user identifier;

correlating the user identifier to a predetermined level of service;

providing an indication of the predetermined level of service to a Packet Control Function unit, wherein providing an indication of the predetermined level of service to the wireless communication system comprises providing the indication via an A11 link to a Packet Control Function unit that comprises a part of the wireless communication system.

20. The method of claim 19 wherein receiving the user identifier via a wireline connection includes receiving the user identifier via a Packet Control Function unit.

21. The method of claim 19 wherein receiving the user identifier via a Packet Control Function unit includes receiving the user identifier via at least one of PPP and Mobile IP on an A10 compatible link.

22. The method of claim 19 wherein receiving from a wireless communication unit via a wireless communication system a user identifier further comprises receiving from a wireless communication unit via a wireless communication system a user identifier, which user identifier corresponds to a given subscriber of a communications service.

23. The method of claim 22 wherein the user identifier is different from a device identifier as is used by the mobile station in the wireless communication system.

24. The method of claim 22 wherein the user identifier is at least partially derived from a device identifier as is used by the mobile station in the wireless communication system.

25. The method of claim 19 wherein correlating the user identifier to a predetermined level of service includes correlating the user identifier to one of a plurality of predetermined levels of service.

26. The method of claim 25 wherein at least some of the plurality of predetermined levels of service comprise predetermined persisting levels of service.

27. The method of claim 25 wherein at least some of the plurality of predetermined levels of service comprises predetermined dynamic relative levels of service.

28. The method of claim 19 wherein correlating the user identifier to a predetermined level of service includes correlating, at a Packet Data Serving Node, the user identifier to a predetermined level of service.

29. The method of claim 19 wherein providing the indication via an A11 link to a Packet Control Function unit that comprises a part of the wireless communication system includes providing the indication as a part of an A11 registration update message.

30. The method of claim 19 wherein providing an indication of the predetermined level of service to the wireless communication system includes providing an indication of a first and second predetermined level of service to the wireless communication system.

31. The method of claim 30 wherein the first predetermined level of service corresponds to communications directed to the wireless communication unit and the second predetermined level of service corresponds to communications received from the wireless communication unit.

32. A Packet Data Serving Node for use with a wireless communication system, comprising:

a Packet Control Function interface;

level of service indication means for correlating a given wireless communication system user identifier with a predetermined level of service; and an output operably coupled to the Packet Control Function interface and the level of service indication means such that an indication of the predetermined level of service is provided to the Packet Control Function interface, wherein the output provides the indication of the predetermined level of service in at least one asynchronously transmitted message.

33. The Packet Data Serving Node of claim 32 wherein the Packet Control Function interface includes an A10/A11 compatible protocol on a link.

34. The Packet Data Serving Node of claim 32 wherein the given wireless communication system user identifier is different from a mobile station identifier for a mobile station as is used by the user to facilitate communications using the wireless communication system.

35. The Packet Data Serving Node of claim 32 wherein the given wireless communication system user identifier is at least partially derived from a mobile station identifier for a mobile station as is used by the user to facilitate communications using the wireless communication system.

36. The Packet Data Serving Node of claim 32 wherein the level of service indication means correlates the given wireless communication system user identifier with one of a plurality of predetermined levels of service.

37. The Packet Data Serving Node of claim 36 wherein at least some of the plurality of predetermined levels of service comprise specific allowed rates of data throughput to be accorded a given user who uses the given wireless communication system user identifier when using the wireless communication system to facilitate subsequent communications.

38. The Packet Data Serving Node of claim 32 wherein the level of service indication means further correlates a given wireless communication system user identifier with at least a first and a second predetermined level of service.

39. The Packet Data Serving Node of claim 38 wherein the first predetermined level of service corresponds to service to be provided for communications sourced by the given wireless communication system user and the second predetermined level of service corresponds to service to be provided for communications directed to the given wireless communication system user.

40. A Packet Data Serving Node for use with a wireless communication system, comprising:

a Packet Control Function interface;

level of service indication means for correlating a given wireless communication system user identifier with a predetermined level of service; and an output operably coupled to the Packet Control Function interface and the level of service indication means such that an indication of the predetermined level of service is provided to the Packet Control Function interface, wherein the output provides the indication of the predetermined level of service in at least one synchronously transmitted message.

41. The Packet Data Serving Node of 40 wherein the output further provides the indication of the predetermined level of service in an A11 update message.

42. The packet data serving node of claim 41 wherein the A11 update message comprises an A11 registration update message.

43. A method comprising:

receiving via a radio access network from a given user using a wireless communication unit a user identifier and an indicator that corresponds to a dynamic relative level of service;

forming a message that includes the indicator;

providing the message as an A11 message to the radio access network such that the radio access network can use the indicator to provide a corresponding dynamic relative level of service to the given user.

44. The method of claim 43 wherein the indicator comprises a diffserv byte.

45. The method of claim 43 wherein forming a message includes forming an A11 registration update message.

46. The method of claim 45 wherein providing the message includes transmitting the A11 registration update message using an A11 compatible protocol.

* * * * *

UNITED STATES PATENT AND TRADEMARK OFFICE
CERTIFICATE OF CORRECTION

PATENT NO.     : 6,940,836 B2
DATED          : September 6, 2005
INVENTOR(S)    : Borella et al.

It is certified that error appears in the above-identified patent and that said Letters Patent is hereby corrected as shown below:

<u>Column 7,</u>
Line 37, change "Persisting" to -- persisting --.

Signed and Sealed this

Twenty-eighth Day of March, 2006

JON W. DUDAS
*Director of the United States Patent and Trademark Office*